(12) United States Patent
Guynn

(10) Patent No.: US 12,540,101 B2
(45) Date of Patent: Feb. 3, 2026

(54) NON-HYDRAULICALLY REACTIVE PARTICULATE MINERAL COMPOSITIONS FOR REDUCING CEMENT CONTENT IN CONCRETE

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 0 days.

(21) Appl. No.: 19/096,059

(22) Filed: Mar. 31, 2025

(65) Prior Publication Data
US 2025/0257010 A1   Aug. 14, 2025

Related U.S. Application Data

(63) Continuation-in-part of application No. 18/961,356, filed on Nov. 26, 2024, and a continuation-in-part of application No. 18/242,445, filed on Sep. 5, 2023.

(51) Int. Cl.
*C04B 28/04* (2006.01)
*C04B 14/00* (2006.01)
*C04B 18/08* (2006.01)
*C04B 18/14* (2006.01)

(52) U.S. Cl.
CPC .............. *C04B 28/04* (2013.01); *C04B 14/00* (2013.01); *C04B 18/08* (2013.01); *C04B 18/141* (2013.01)

(58) Field of Classification Search
CPC ......... C04B 28/04; C04B 14/00; C04B 18/08; C04B 18/141
See application file for complete search history.

(56) References Cited

U.S. PATENT DOCUMENTS

| | | | |
|---|---|---|---|
| 4,640,715 A | 2/1987 | Heitzmann et al. | |
| 4,642,137 A | 2/1987 | Heitzmann et al. | |
| 5,626,665 A | 5/1997 | Barger et al. | |
| 7,442,248 B2 | 10/2008 | Timmons | |
| 8,377,201 B2 | 2/2013 | Guynn et al. | |
| 8,551,245 B2 | 10/2013 | Guynn et al. | |
| 8,974,593 B2 | 3/2015 | Guynn et al. | |
| 8,974,598 B2 | 3/2015 | Fonollosa et al. | |
| 9,067,824 B1 | 6/2015 | Hansen et al. | |
| 9,238,591 B2 | 1/2016 | Guynn et al. | |
| 9,272,953 B2 | 3/2016 | Guynn et al. | |
| 9,926,234 B2 | 3/2018 | Toussaint et al. | |
| 10,131,575 B2 * | 11/2018 | Guynn | C04B 18/02 |
| 10,233,116 B1 | 3/2019 | Guynn | |
| 10,494,298 B1 | 12/2019 | Guynn | |
| 10,730,805 B2 | 8/2020 | Guynn | |
| 10,737,980 B2 * | 8/2020 | Guynn | C04B 7/527 |
| 10,865,145 B2 * | 12/2020 | Cappellari | C04B 14/24 |
| 11,168,029 B2 * | 11/2021 | Guynn | C04B 28/145 |
| 11,365,152 B2 * | 6/2022 | Zampini | C04B 18/02 |
| 11,919,813 B2 | 3/2024 | Romaniuk et al. | |
| 12,091,361 B2 | 9/2024 | Romaniuk et al. | |
| 12,151,974 B2 * | 11/2024 | Guynn | B01D 53/80 |
| 2003/0159624 A1 | 8/2003 | Kinuthia et al. | |
| 2006/0201395 A1 | 9/2006 | Barger et al. | |
| 2007/0095255 A1 | 5/2007 | Abbate et al. | |
| 2007/0266906 A1 | 11/2007 | Garcia | |
| 2012/0037045 A1 | 2/2012 | Fonollosa et al. | |
| 2015/0144030 A1 | 5/2015 | Guynn et al. | |
| 2017/0121227 A1 | 5/2017 | Perez et al. | |
| 2017/0166791 A1 | 6/2017 | Greenwald | |
| 2018/0065888 A1 | 3/2018 | Donovan et al. | |
| 2018/0194679 A1 | 7/2018 | Guynn | |
| 2023/0202925 A1 | 6/2023 | Romaniuk et al. | |
| 2025/0002414 A1 | 1/2025 | Romaniuk et al. | |

FOREIGN PATENT DOCUMENTS

EP          3636615 A1 *   4/2020   .......... C04B 20/008

OTHER PUBLICATIONS

Author Unknown, "User Guidelines for Waste and Byproduct Materials in Pavement Construction" Publication No. FHWA-RD-97-148, Federal Highway Administration Research and Technology, U.S. Department of Transportation, Last Updated Mar. 8, 2016, 9 pages.

Barger, GS, "Production and Use of Calcined Natural Pozzolans in Concrete," Journal of Cement, Concrete and Aggregates, vol. 23, Issue 2, Dec. 2001.

Bentz D. P. et al., "Minimizing paste content in concrete using limestone powders—demonstration mixtures" National Institute of Standards and Technology, U.S. Department of Commerce, Jan. 2016, 49 pages.

Bentz, D., "Calorimetric Studies of Powder Additions to Mitigate Excessive Retardation in High Volume Fly Ash Mixtures", ACI Materials Journal pp. 1-20, Sep. 9, 2009.

Bentz, D., "Limestone Fillers Conserve Cement, Part 1: An analysis based on Powders' model", Concrete International, pp. 41-46, Nov. 2009.

(Continued)

*Primary Examiner* — Anthony J Green
(74) *Attorney, Agent, or Firm* — Workman Nydegger

(57) ABSTRACT

Non-hydraulically reactive blended particulate compositions for use in making low carbon blended cement or low carbon concrete include a pozzolanic component having a first D90 and a mineral filler component having a second D90 greater than the first D90 dry blended without intergrinding, wherein the composition is free of hydraulic cement. The pozzolanic component can have a D90 less about 45 μm and the mineral filler can have a D90 greater than about 45 μm. The pozzolanic material can be fly ash, bottom ash, steel slag, silica fume, metakaolin, volcanic ash, natural pozzolan, calcined shale, calcined clay, and/or ground glass. The mineral filler component can be aggregate fines, quarry fines, limestone powder, granite fines, stone dust, rock dust, marble dust, mine tailings, pulverized bottom ash, pulverized metallurgical slag, ground recycled concrete, pulverized shale from shale oil extraction, or pulverized sand from tar sand extraction.

21 Claims, No Drawings

(56) References Cited

OTHER PUBLICATIONS

Bentz, D.P. et al., "Fine limestone additions to regulate setting in high volume fly ash mixtures" Cement and Concrete Composites, Oct. 2011, 16 pages.

Cement & Concrete Composites: High-volume natural volcanic pozzolan and limestone powder as partial replacements for Portland cement in self-compacting and sustainable concrete, K. Celik et al., Cement & Concrete Composites 45 (2014) 136- 147).

De Weerdt et al., Hydration mechanisms of ternary Portland cements containing limestone powder and fly ash, Cement & Concrete Research (Accepted Nov. 19, 2010).

De Weerdt et al., Synergy between fly ash and limestone powder in ternary cements, Cement & Concrete Composites (Accepted Sep. 7, 2010).

De Weerdt, Klaartje et al. "Fly ash-limestone ternary composite cements: synergetic effect at 28 days." 20 pages.

Dufalla, Nicole, et al., "Guidelines for Use of Waste Concrete Fines", Jul. 2014.

Hooton, R.D. et al. "Portland-Limestone Cement: State-of-the-Art Report and Gap Analysis for CSA A 3000" Cement Associate of Canada, University of Toronto, 2007, 59 pages.

Kankam, Charles K. et al., "Stress-strain characteristics of concrete containing quarry rock dust as partial replacement of sand" Case Studies in Construction Materials 7 (2017), 7 pages.

Kumar, Doraiswamy Sentil et al., "Use of quarry fines for engineering and environmental applications" Special research report for the National Stone Association, Oct. 1992, 139 pages.

Magistri, Mario et al., "Investigation on the reactivity of cement additives in blended cements" R&D Cement Additives Division & Analytical Lab, Mapei SpA, Milan, Italy, 10 pages.

Matschei, Thomas et al. "The Role of Calcium Carbonate in Cement Hydration" Cement and Concrete Research 37 (2007), Feb. 23, 2006, 9 pages.

Muhit, Imrose B. et al. "Determination of mortar strength using stone dust as a partially replaced material for cement and sand" Advances in Concrete Construction, vol. 2, No. 4 (2014) pp. 249-259.

Mumacooglu, T. Kuxnetsov et al. "Development of sustainable mortar and concrete made of limestone blended cement—influence of particle size" 9th International Conference on Fracture Mechanics of Concrete and Concrete Fractures, May 2016, 7 pages.

N. Kavibala, "Experimental Study on Partial Replacement of Cement with Marble Powder and Fine Aggregate with Quarry Dust and with Addition of Polypropylene Fiber" International Conference on Current Research in Engineering Science and Technology (ICCREST-2016) E-ISSN: 2348-8352, 4 pages, 2016.

Naik, Tarun R. et al., "Use of fly ash and limestone quarry by-products for developing economical self-compacting concrete" International Congress on Fly Ash Utilization, Dec. 4-7, 2005, New Delhi, India, 18 pages.

Phung, Quoc Tri et al., "Effect of Limestone Fillers on Ca-Leaching and Carbonization of Cement Pastes" Kev Engineering Materials, Sep. 2016, 9 pages.

Phung, Quoc Tri et al., "Effect of limestone fillers on microstructure and permeability due to carbonization of cement pastes under controlled CO2 pressure conditions" Construction and Building Materials, 2015, 15 pages.

Phung, Quoc Tri et al., "Effects of W/P Ratio and Limestone Filler on Permeability of Cement Pastes" Proceeding of the International RILEM Conference, Materials, Systems and Structures in Civil Engineering Aug. 22-24, 2016, 14 pages.

Preethi G. et al., "Effect of replacement of cement with dolomite powder on the mechanical properties of concrete" IJISET—International Journal of Innovative Science, Engineering & Technology, Vo. 2, Issue 4, Apr. 2015, 6 pages.

Pure Natural Pozzolan Cement, Azmar International, Inc., pp. 1-11 {al least as early as Jul. 2008).

Safiuddin, Md et al., "Utilization of Quarry Waste Fine Aggregate in Concrete Mixtures" Journal of Applied Sciences Research, 3(3): 202-208, 2007, 8 pages.

Sato et al., Effect of nano-CaCO3 on hydration of cement containing supplementary cementitious materials, Advance in Cement Research, 23, (1), pp. 1-29, Oct. 2010.

Shrivastava, Anil Kumar et al., "Effect of quarry fines in concrete" IJSRD—International Journal for Scientific Research & Development, vol. 3, Issue 01, 2015, ISSN: 2321-0613; 4 pages.

U.S. Patent Application filed Oct. 24, 2016, by John M. Guynn, U.S. Appl. No. 15/332,468.

Vogt, Carsten, "Ultrafine particles in concrete: Influence of ultrafine particles on concrete properties and application to concrete mix design," Doctoral Thesis, School of Architecture and the Build Environment, Division of Concrete Structures, Royal Institute of Technology, Sweden, TRITA-BKN. Bullentin 103, 2010.

\* cited by examiner

NON-HYDRAULICALLY REACTIVE PARTICULATE MINERAL COMPOSITIONS FOR REDUCING CEMENT CONTENT IN CONCRETE

CROSS-REFERENCE TO RELATED APPLICATIONS

This Application is a continuation-in-part of U.S. patent application Ser. No. 18/242,445, filed Sep. 5, 2023, and a continuation-in-part of U.S. patent application Ser. No. 18/961,356, filed Nov. 26, 2024, which are incorporated by references in their entirety.

BACKGROUND OF THE INVENTION

1. Field of the Invention

The invention is generally in the field of supplementary cementitious materials (SCMs) and mineral fillers for use as substitutes for hydraulic cement in concrete.

2. Relevant Technology

Portland cement, sometimes referred to as "OPC" (or "ordinary Portland cement"), is the most expensive component of concrete and is responsible for substantially all of the embodied carbon in concrete. The manufacture of cement clinker is responsible for an estimated 6-8% of all anthropogenic $CO_2$. There is a long-felt but unmet need to reduce cement clinker ("clinker") consumption.

Supplementary Cementitious Materials ("SCMs"), such as fly ash, slag, natural pozzolans, and limestone, are often used to replace a portion of Portland cement in concrete. SCMs can yield improved concrete with higher durability, lower chloride permeability, reduced creep, increased resistance to chemical attack, lower cost, and reduced environmental impact. Pozzolans react with calcium hydroxide released during cement hydration. Limestone can provide a filler effect and nucleation sites.

Cement producers typically make blended cements by intergrinding cement clinker with SCMs and gypsum. While intergrinding is an efficient and cost-effective way to make blended cements, it is impossible to control the particle sizes of the individual components. And such blends are hydraulically reactive, are sensitive to moisture, and therefore have limited shelf life unless stored in a way that prevents contact with moisture or humid air. Unless blended cements are stored in a completely air tight environment, they will absorb moisture from the air and lose reactivity.

SUMMARY

Disclosed herein are non-hydraulically reactive particulate mineral compositions for use in making low carbon blended cements and low carbon concrete mixes. The particulate mineral compositions comprise one or more pozzolanic materials and one or more mineral fillers. Because the particulate blends are made so as to not be significantly hydraulically reactive, they do not lose their beneficial characteristics when exposed to moisture and humidity. As a result, they have essentially limitless shelf life.

The particulate mineral compositions can be particle size optimized relative to each other and/or the hydraulic cement component when making concrete in order to maximize the relative contributions of each component, with the pozzolanic component being relative fine to increase or maximize pozzolanic reactivity and the mineral filler being relatively coarse to reduce or minimize water demand while increasing the particle packing density of the particulate components of cement paste. In some embodiments, the pozzolanic component can have greater fineness than ordinary Portland cement (OPC), and the mineral filler component can have a lower fineness than OPC. The result is a cement paste that is optimized relative to the strength, water demand, particle packing density, and other physical and performance criteria.

These and other advantages and features of the invention will become more fully apparent from the following description and appended claims, or may be learned by the practice of the invention as set forth hereinafter.

DETAILED DESCRIPTION

Disclosed herein are non-hydraulically reactive particulate mineral compositions for use in making low carbon blended cements and low carbon concrete mixes. The particulate mineral compositions comprise one or more pozzolanic materials and one or more mineral fillers. Because the particulate blends are non-hydraulically reactive, they do not lose their beneficial characteristics when exposed to moisture and humidity. As a result, they have essentially limitless shelf life. They can also be particle size optimized relative to each other and/or the hydraulic cement component of concrete.

An example method of manufacturing non-hydraulically reactive blended particulate composition for use in making low carbon blended cement or low carbon concrete, comprises:

combining a pozzolanic component having a first D90 and a mineral filler component without intergrinding to form the non-hydraulically reactive blended particulate composition, the mineral filler component having a second D90 greater than the first D90, wherein the composition is free of hydraulic cement.

In some embodiments, the particulate mineral compositions are particle size optimized relative to each other and/or the hydraulic cement component when making concrete in order to maximize the relative contributions of each component, with the pozzolanic component being relative fine to increase or maximize pozzolanic reactivity and the mineral filler being relatively coarse to reduce or minimize water demand while increasing the particle packing density of the particulate components of cement paste. In some embodiments, the pozzolanic component can have a fineness that is greater than the fineness of ordinary Portland cement (OPC), and the mineral filler component can have a fineness that is less than the fineness of OPC. The result is a cement paste that is optimized relative to the strength, water demand, particle packing density, and other physical and performance criteria.

The non-hydraulically reactive particulate mineral compositions comprise one or more pozzolanic materials that can react with excess lime released during cement hydration (i.e., is pozzolanically reactive) and one or more non-pozzolanic mineral fillers. The pozzolanic component is characterized by having a high amorphous silica content, and can also contain alumina and iron oxide (preferably, so as to comply with the SAF requirements of ASTM C618). Examples of suitable pozzolanic materials include, but are not limited to, fly ash, natural pozzolans, volcanic ash, pumice, silica fume, metakaolin, calcined clay, non-hydraulically reactive metallurgical slags, and ground glass.

Because pozzolanic materials are more pozzolanically reactive with increasing fineness (i.e., smaller particle size), they can advantageously have a D90 that is equal to or less than about 45 µm, such as equal to or less than about 40 µm, or equal to or less than about 35 µm, or equal to or less than about 30 µm, or equal to or less than about 27.5 µm, or equal to or less than about 25 µm, or equal to or less than about 22.5 µm, or equal to or less than about 20 µm, or equal to or less than about 17.5 µm, or equal to or less than about 15 µm, or equal to or less than about 12.5 µm, or equal to or less than about 10 µm, or equal to or less than about 7.5 µm, or equal to or less than about 5 µm, or have a D90 within a range defined by any two of the foregoing.

The non-hydraulically reactive particulate mineral compositions comprise one or more mineral fillers that are generally not pozzolanically reactive (e.g., mineral fines that comply with ASTM C1797 and/or ACI 211.7R). Examples of suitable mineral fillers, include, but are not limited to, ground limestone powder, quarry fines, rock dust, ground recycled concrete, ground minerals, ground quartz, ground granite, ground basalt, mine tailings, and marble dust. Mineral fillers may also comprise semi-pozzolanic materials that do not meet the requirements of ASTM C618, such as by having a low SAF content and/or low reactivity index.

Because mineral fillers are not deliberately selected to be pozzolanically reactive, and may not be pozzolanically reactive at any particle size, and because water demand decreases with decreasing fineness (i.e., larger particle size), they can advantageously have a D90 that is greater than about 45 µm, such as equal to or greater than about 50 µm, or equal to or greater than about 55 µm, or equal to or greater than about 60 µm, or equal to or greater than about 65 µm, or equal to or greater than about 70 µm, or equal to or greater than about 75 µm, or equal to or greater than about 80 µm, or equal to or greater than about 90 µm, or equal to or greater than about 100 µm, or equal to or greater than about 110 µm, or equal to or greater than about 120 µm, or equal to or greater than about 135 µm, or equal to or greater than about 150 µm, or equal to or greater than about 175 µm, or equal to or greater than about 200 µm, or equal to or greater than about 225 µm, or equal to or greater than about 250 µm, or equal to or greater than about 275 µm, or equal to or greater than about 300 µm, or have a D90 within a range defined by any two of the foregoing.

In some embodiments, the ratio of the D90 of the mineral filler component to the D90 of the pozzolanic component can be about 1.1:1, or about 1.25:1, or about 1.5:1, or about 1.75:1, or about 2:1, or about 2.5:1, or about 3:1, or about 4:1, or about 5:1, or about 6:1, or about 7:1, or about 8:1, or about 9:1, or about 10:1, or within a range define by any two of the foregoing ratios.

In some embodiments, the ratio of the D50 of the mineral filler component to the D50 of the pozzolanic component can be about 1.1:1, or about 1.25:1, or about 1.5:1, or about 1.75:1, or about 2:1, or about 2.5:1, or about 3:1, or about 4:1, or about 5:1, or about 6:1, or about 7:1, or about 8:1, or about 9:1, or about 10:1, or within a range define by any two of the foregoing ratios.

In some embodiments, the ratio of the D10 of the mineral filler component to the D10 of the pozzolanic component can be about 1.1:1, or about 1.25:1, or about 1.5:1, or about 1.75:1, or about 2:1, or about 2.5:1, or about 3:1, or about 4:1, or about 5:1, or about 6:1, or about 7:1, or about 8:1, or about 9:1, or about 10:1, or within a range define by any two of the foregoing ratios.

In some embodiments, the non-hydraulically reactive particulate mineral compositions can contain equal amounts by weight or volume of the pozzolanic component and mineral filler component. Depending on the desired resulting blended cement when combined with hydraulic cement, the non-hydraulically reactive particulate mineral composition may include a greater or lesser quantity of the pozzolanic component than the mineral filler component. In some embodiments, particularly where the pozzolanic component is finer than OPC and the mineral filler component is coarser than OPC, the non-hydraulically reactive particulate mineral compositions can include a greater quantity of the mineral filler component than the pozzolan component. This is because there are practical constraints to how much additional fine particles can be added to OPC, i.e., so as to "fit" within the finer section of the overall particle size distribution. On the other hand, because the size gap between the largest OPC particles and smallest aggregate particles is relatively large, there is more "room" to add a greater quantity of the mineral filler component.

In view of the foregoing, the ratio of the mineral filler component to the pozzolanic component, expressed by weight or by volume, can be about 30:70, or about 40:60, or about 50:50 (e.g., 49:50, 49.5:50.5, or 49.9:50.1), or about 55:45, or about 60:40, or about 65:35, or about 70:30, or about 75:25, or about 80:20, or about 90:10, or within a range define by any two of the foregoing ratios.

In order for the non-hydraulically reactive particulate mineral compositions to remain stable in the presence of moisture and not be significantly hydraulically reactive, the non-hydraulically reactive particulate mineral compositions can have a total alkali and alkaline earth metal oxide and hydroxide content of less than 10%, or less than about 9%, or less than about 8%, or less than about 7%, or less than about 6%, or less than about 5%, or less than about 4%, or less than about 3%, or less than about 2%, or less than about 1%. Moreover, even if the pozzolan contains a higher quantity of lime, such as class C fly ash, it may not be harmful, and it may in fact be beneficial, for the at least some of the lime to absorb moisture and react with carbon dioxide in the air to form calcium carbonate The terms "hydraulic cement" and "cement" shall include Portland cement, cements defined by ASTM C150 (Types I-V) and similar materials that contain one or more of the four clinker minerals: $C_3S$ (tricalcium silicate), $C_2S$ (dicalcium silicate), C3A (tricalcium aluminate), and $C_4AF$ (tetracalcium aluminoferrite). Other examples of hydraulic cement include white cement, calcium aluminate cement, high-alumina cement, magnesium silicate cement, magnesium oxychloride cement, oil well cements (e.g., Type VI, VII and VIII), magnesite cements, and combinations of these. Ground granulated blast-furnace slag (GGBFS) and other slags that include one or more clinker minerals may also function as hydraulic cement.

The term "pozzolan" means glassy silicas and aluminosilicates that are pozzolanically reactive in the presence of free lime released during hydration of Portland cement. Examples include, but are not limited to, fly ash, finely ground bottom ash, finely ground steel slag, silica fume, metakaolin, volcanic ash, natural pozzolan, trass, calcined shale, calcined clay, and ground glass.

The term "mineral filler" means any particulate mineral material that is not hydraulically reactive and may have limited to no pozzolanic reactivity. Examples include, but are not limited to, waste aggregate particles or fines, waste or manufactured limestone fines, quarry fines, limestone powder, ground quartz, granite fines, waste minerals from crushed rock, waste minerals from sand, stone dust, rock dust, marble dust, mine tailings, pulverized bottom ash, pulverized non-cementitious metallurgical slag, ground recycled concrete, waste or pulverized shale from shale oil extraction, waste or pulverized sand from tar sand extraction, precipitated calcium carbonate, precipitated magnesium carbonate, and red mud.

In some embodiments, the pozzolanic component comprises at least two pozzolans blended without intergrinding selected from the group consisting of fly ash, finely ground bottom ash, finely ground steel slag, silica fume, metakaolin, volcanic ash, natural pozzolan, trass, calcined shale, calcined clay, ground glass, and combinations thereof. In other embodiments, the pozzolanic component comprises at least two pozzolans interground together selected from the group consisting of fly ash, finely ground bottom ash, finely ground steel slag, silica fume, metakaolin, volcanic ash, natural pozzolan, trass, calcined shale, calcined clay, ground glass, and combinations thereof. In still other embodiments the pozzolanic component comprises at least one pozzolan interground with a mineral filler OPC or other hydraulic cement can be blended with the non-hydraulically reactive particulate mineral composition prior to or during the manufacture of concrete. In some embodiments, the non-hydraulically reactive particulate mineral composition can be used to manufacture concrete by blending it with OPC or other hydraulic cement, aggregates, water, and optional chemical admixtures. When kept free of hydraulic cement, the non-hydraulically reactive particulate mineral composition can have essentially indefinite shelf live, which is a major advancement over typical blended cements.

An example method of manufacturing low carbon blended cement comprising combining a non-hydraulically reactive blended particulate composition with hydraulic cement without intergrinding. In some embodiments, the hydraulic cement is selected from Portland cement and ground granulated blast furnace slag.

An example method of manufacturing low carbon concrete comprises:
  combining the non-hydraulically reactive blended particulate composition of any one of claims 1 to 13, hydraulic cement, aggregate, and water to form a fresh concrete mix;
  positioning the fresh concrete mix in a desired shape; and
  allowing the fresh concrete mix to harden to form hardened concrete.

Another important advantage of the non-hydraulically reactive particulate mineral compositions is that they can be stored in a single silo at a concrete manufacturing facility. This eliminates the need to have separate silos for the pozzolan and mineral filler components, thereby facilitating incorporation of the non-hydraulically reactive particulate mineral compositions in existing concrete manufacturing plants. Most concrete plants have dedicated silos for cement, fly ash or other pozzolan, and, in some regions, ground granulated blast furnace slag. However, a major impediment to incorporating mineral fillers in concrete is the need to retrofit existing concrete plants with an extra silo. However, the non-hydraulically reactive particulate mineral composition can be placed into an existing silo at a concrete plant, such as a dedicated pozzolan silo. The only modification would modification of the concrete mix designs to account for the presence of the mineral filler and its effect on slump and rheology in freshly mixed concrete and the strength of hardened concrete.

Another advantage of the non-hydraulically reactive particulate mineral compositions is that they can significantly reduce the amount of pozzolan that would otherwise be required to yield concrete having desired workability and strength. Pozzolans often serve the dual purpose of reducing cement content while maintaining or increasing overall cement paste content in concrete in order to maintain desired workability and strength. However, non-hydraulically reactive particulate mineral compositions can maintain or increase paste content in concrete so as to maintain desired workability and strength, while permitting even greater reductions in cement content compared to conventional concrete made using cement and pozzolans. Moreover, it is also possible to reduce both cement content and pozzolan content compared to conventional concrete, while maintaining or increasing cement paste content, by incorporating a mineral filler.

It is currently known that fly ash is becoming scarce as coal fired power plants are being phased out. As a result, companies are now stockpiling fly ash for use over time, which will increase its cost and value. Blending scarce fly ash with a mineral filler component yields a non-hydraulically reactive particulate mineral composition that can provide concrete with the desired benefits of fly ash, while using less pozzolan per unit of concrete. This will have the effect of extending the supply of fly ash or other pozzolans, which are typically much more expensive than mineral fillers.

In some embodiments, the non-hydraulically reactive particulate mineral composition can be dry blended with OPC or other hydraulic cement, with the understanding that the resulting blended cement will then have limited shelf life typical of OPC and other hydraulic cements. For example, the non-hydraulically reactive particulate mineral composition can be stored indefinitely until such time as it may be desired to make a blended cement comprising OPC, pozzolan, and mineral filler. The non-hydraulically reactive particulate mineral composition can be manufactured at a dedicated blending facility and stored indefinitely until such time as it may be desired to make a blended cement that can be delivered to concrete manufacturing plants.

The pozzolan and mineral filler components are typically manufactured separately and then dry blended to form the non-hydraulically reactive particulate mineral composition. In this way, the PSD of each component can be controlled. For example, a pozzolan can be processed by grinding, air classification, and/or calcining to form the pozzolan component. The mineral filler can be processed by grinding to a coarser PSD in a separate process and then dry blended with the pozzolan.

The non-hydraulically reactive particulate mineral composition can further include one or more chemical admixtures and additives known in the art, such as one or more water reducers, accelerators, hydration stabilizers, and air entraining agents. Water reducers include low range, mid range, and high range water reducers. Admixtures and additives can be added to the non-hydraulically reactive particulate mineral composition at any stage of manufacture, such as when grinding the pozzolan and/or mineral filler and/or when dry-blending with the pozzolan and mineral filler components. Because the hydraulically reactive particulate mineral composition does not become deactivated when exposed to moisture, liquid admixtures can be added to the grinding process and used as a grinding aid, with the water being driven off by evaporation as a result of heat generated by the grinding process.

The pozzolan and mineral filler components can be processed by equipment known in the art. Example grinding equipment includes a rod mill, vertical roller mill ("VRM"), high pressure grinding roll, hammer mill, or ball mill. Air classifiers can be used to further control particle size, including as stand-alone equipment or incorporated within a grinding circuit.

The non-hydraulically reactive particulate mineral composition can be used to replace a portion of OPC or other hydraulic cement in concrete, including site blends of OPC and SCM, interground blends, and other cements known in the art. They can be used to make concrete, ready mix concrete, bagged concrete, bagged cement, mortar, bagged mortar, grout, bagged grout, molding compositions, or other fresh or dry cementitious compositions known in the art. Non-hydraulically reactive particulate mineral compositions can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to cementitious compositions continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

Water is both a reactant and rheology modifier that permits a fresh cementitious composition to flow or be molded into a desired configuration. Hydraulic cement reacts with water, binds the other solid components together, and is most responsible for early strength development and can contribute to later strength development. Blends with high PPD have reduced void space, which reduces water demand and increases workability for a given quantity of water.

An example of another blended particulate composition for use in making low carbon blended cement or low carbon concrete includes a blend of ground granulated blast furnace slag having a first D90 and a mineral filler component dry blended with the ground granulated blast furnace slag without intergrinding, the mineral filler component having a second D90 greater than the first D90, wherein the composition is free of Portland cement.

This blended particulate composition may further comprise at least pozzolan and/or mineral filler blended with the ground granulated blast furnace slag. The blended particulate composition can further be blended with Portland cement to make low carbon blended cement or blended with Portland cement, aggregates, water, and optional admixtures to make low carbon concrete.

EXAMPLES

Concrete compositions were manufactured by blending together OPC, a pozzolan, a mineral filler, aggregates, water, and admixtures. In some cases, the pozzolan and mineral filler components were initially dry blended to form a non-hydraulically reactive particulate mineral composition, which was then combined with OPC, aggregates, water, and admixtures to form fresh concrete mixes. In other cases, the non-hydraulically reactive particulate mineral composition was dry blended with OPC to form a blended cement to ensure good dispersion just prior to mixing the blended cement with water, aggregates, and admixtures to make fresh concrete mixes. The fresh concrete mixes were cast into cylindrical molds and tested for strength.

Examples 1-10

Non-hydraulically reactive particulate mineral compositions were prepared and then used to make a series of low carbon precast concrete compositions. The precast concrete compositions were prepared using dry blends of natural pozzolan (Geofortis) and ground limestone (Graymont) prepared by mixing without intergrinding. The natural pozzolan reportedly had a D90 of less than 45 μm (about 35-40 μm), and the ground limestone reportedly had a D90 greater than 45 μm (about 70-90 μm). The Portland cement was ASTM C595 IL cement from Holcim, Devil's Slide, Utah.

The non-hydraulically reactive particulate mineral compositions were added to a laboratory size rotary mixer as a subcomponent and mixed with Portland cement, water, aggregates, and various chemical admixtures (i.e., air entrainer, water reducers, etc.) to obtain freshly mixed precast concrete compositions. The freshly mixed precast concrete compositions were placed into 4×8 inch test cylinders, which were capped, allowed to harden, and taken to CMT Technical Services (West Vally City, Utah) for storage in a curing chamber and testing at various time intervals.

Tables 1 and 2 show complete mix designs (based on 1 cubic yard, exclusive of admixtures) used to prepare low carbon precast concrete compositions using the non-hydraulically reactive particulate mineral composition as a subcomponent.

TABLE 1

| Components (lb/yd³) | Example # (Mix ID) | | | | |
|---|---|---|---|---|---|
| Compressive Strength | 1 (952) | 2 (952L) | 3 (952P) | 4 (952NP) | 5 (952P2) |
| ASTM C595 IL cement | 570 | 570 | 570 | 570 | 570 |
| Natural Pozzolan | 150 | 150 | 150 | 162 | 160 |
| Limestone Powder | 224 | 216 | 222 | 212 | 212 |
| Type S Lime | 0 | 8 | 0 | 0 | 0 |
| Plaster of Paris | 0 | 0 | 2 | 2 | 2 |
| Coarse Aggregate (¾″) | 1095 | 1095 | 1095 | 1095 | 1095 |
| Pea Gravel | 247 | 247 | 247 | 247 | 247 |
| Fine Aggregate (sand) | 1071 | 1059 | 1070 | 1069 | 1032 |
| Water | 292 | 296 | 292 | 292 | 292 |
| 1-day (psi/MPa) | | | 3255/22.4 | | |
| 3-day (psi/MPa) | 4875/33.6 | 4750/32.8 | 5465/37.7 | | 5490/37.9 |
| 7-day (psi/MPa) | 5620/33.6 | 5340/36.8 | 6325/43.6 | | 7335/50.6 |
| 28-day (psi/MPa) | 6555/45.2 | 6665/46.0 | 7900/54.5 | | 8875/61.2 |
| 56-day (psi/MPa) | 7425/51.2 | 7405/51.1 | | | |

TABLE 2

| Components (lb/yd³) | Example # (Mix ID) | | | | |
|---|---|---|---|---|---|
| Compressive Strength | 6 (103) | 7 (103P) | 8 (103P1) | 9 (103P2) | 10 (753P) |
| ASTM C595 IL cement | 547 | 546 | 547 | 547 | 395.2 |
| Natural Pozzolan | 198 | 216 | 198 | 198 | 252.27 |
| Limestone Powder | 245 | 225 | 234 | 243 | 130 |
| Type S Lime | 0 | 0 | 0 | 0 | 0 |
| Plaster of Paris | 0 | 3 | 2 | 2 | 2.54 |
| Coarse Aggregate (¾") | 1090 | 1095 | 1088 | 1090 | 1550 |
| Pea Gravel | 232 | 247 | 230 | 231 | 0 |
| Fine Aggregate (sand) | 1080 | 1079 | 1081 | 1080 | 1104 |
| Water | 297 | 288 | 301.5 | 297 | 292 |
| 1-day (psi/MPa) | | 4120 | | 3175/21.9 | |
| 2-day (psi/MPa) | | | | | 1790/12.3 |
| 3-day (psi/MPa) | | 6270/43.2 | 4375/30.2 | 5570/38.4 | 3700/25.5 |
| 7-day (psi/MPa) | | 7545/52.0 | 5340/36.8 | 6570/45.3 | 5110/35.2 |
| 28-day (psi/MPa) | | 9855/67.9 | 7235/49.9 | 8750/60.3 | 7390/51.0 |
| 56-day (psi/MPa) | | | | | 8360/57.6 |
| 91-day (psi/MPa) | | | | | 9940/68.5 |

Examples 11-20

Non-hydraulically reactive particulate mineral compositions were prepared and then used to make a series of low carbon ready mix concrete compositions. The ready mix concrete compositions were prepared using dry blends of natural pozzolan (Geofortis) and ground limestone (Graymont) prepared by mixing without intergrinding. The natural pozzolan reportedly had a D90 of less than 45 μm (about 35-40 μm), and the ground limestone reportedly had a D90 greater than 45 μm (about 70-90 μm).

The non-hydraulically reactive particulate mineral compositions were added to a laboratory size rotary mixer as a subcomponent and mixed with Portland cement, water, aggregates, and various chemical admixtures (i.e., air entrainer, water reducers, etc.) to obtain freshly mixed ready mix concrete compositions. The freshly mixed ready mix concrete compositions were placed into 4×8 inch test cylinders, which were capped, allowed to harden, and taken to CMT Technical Services (West Vally City, Utah) for storage in a curing chamber and testing at various time intervals. The Portland cement was ASTM C595 IL cement from Holcim, Devil's Slide, Utah.

Tables 3 and 4 show complete mix designs (based on 1 cubic yard, exclusive of admixtures) used to prepare low carbon ready mix concrete compositions using the non-hydraulically reactive particulate mineral composition as a subcomponent.

TABLE 3

| Components (lb/yd³) | Example # (Mix ID) | | | | |
|---|---|---|---|---|---|
| Compressive Strength | 11 (1-3000) | 12 (1-2100) | 13 (2-2100) | 14 (3-2100) | 15 (1-4000) |
| ASTM C595 IL cement | 325 | 390 | 390 | 390 | 415 |
| Natural Pozzolan | 100 | 102 | 105 | 105 | 78 |
| Limestone Powder | 150 | 144 | 141 | 141 | 150 |
| Type S Lime | 0 | 0 | 0 | 0 | 0 |
| Plaster of Paris | 0 | 0 | 0 | 0 | 0 |
| Coarse Aggregate (¾") | 1520 | 1720 | 1720 | 1720 | 1720 |
| Fine Aggregate (sand 1) | 700 | 0 | 0 | 0 | 0 |
| Fine Aggregate (sand 2) | 710 | 1155 | 1150 | 1150 | 1117 |
| Water | 270 | 252 | 252 | 252 | 264 |
| 3-day (psi/MPa) | 1900/13.1 | 3550/24.5 | 3195/22.0 | | 2610/18.0 |
| 7-day (psi/MPa) | 2610/18.0 | 4330/29.9 | 3625/25.0 | 3810/26.3 | 3010/20.8 |
| 28-day (psi/MPa) | 3865/26.6 | 5545/38.2 | 4885/33.7 | 5095/35.1 | 4045/27.9 |
| 56-day (psi/MPa) | 4580/31.6 | 6240/43.0 | 5630/38.8 | 5510/38.0 | 4220/29.1 |

TABLE 4

| Components (lb/yd³) | Example # (Mix ID) | | | | |
|---|---|---|---|---|---|
| Compressive Strength | 16 (2-4000) | 17 (3-4000) | 18 (4-4000) | 19 (1-5000) | 20 (2-5000) |
| ASTM C595 IL cement | 399 | 399 | 388.2 | 483 | 448 |
| Natural Pozzolan | 99 | 99 | 109.8 | 98 | 126 |
| Limestone Powder | 160 | 154 | 156 | 182 | 182 |
| Type S Lime | 0 | 6 | 0 | 0 | 0 |
| Plaster of Paris | 0 | 0 | 0 | 0 | 0 |
| Coarse Aggregate (¾") | 1730 | 1730 | 1730 | 1650 | 1661 |
| Fine Aggregate (sand 1) | 0 | 0 | 0 | 320 | 330 |
| Fine Aggregate (sand) | 1123 | 1122 | 1118 | 746 | 740 |
| Water | 250.2 | 250.2 | 250.2 | 266 | 255.5 |
| 3-day (psi/MPa) | 3460/23.9 | 2670/18.4 | 3660/25.2 | 4480/30.9 | 4670/32.2 |

TABLE 4-continued

| Components (lb/yd³) | Example # (Mix ID) | | | | |
|---|---|---|---|---|---|
| Compressive Strength | 16 (2-4000) | 17 (3-4000) | 18 (4-4000) | 19 (1-5000) | 20 (2-5000) |
| 7-day (psi/MPa) | 4065/28.0 | 3150/21.7 | 4165/28.7 | 5105/35.2 | 5215/36.0 |
| 28-day (psi/MPa) | 5420/37.4 | 4145/28.6 | 5975/41.2 | 6525/45.0 | 7155/49.3 |
| 56-day (psi/MPa) | 5665/39.1 | 4565/31.5 | 6555/45.2 | 7320/50.5 | 7865/54.2 |

Examples 21-30

Non-hydraulically reactive particulate mineral compositions were prepared and then used to make a series of low carbon ready mix concrete compositions. The ready mix concrete compositions were prepared using dry blends of Type F fly ash (Jim Bridger, Wyoming or Lafarge Canada) and ground limestone (Graymont) prepared by mixing without intergrinding. The fly ash reportedly had a D90 of less than 45 μm (about 35-40 μm), and the ground limestone reportedly had a D90 greater than 45 μm (about 70-90 μm). The Portland cement was ASTM C595 IL cement from Ash Grove, Leamington, Utah, Lafarge, Exshaw, Alberta, or Holcim, Devil's Slide, Utah.

The non-hydraulically reactive particulate mineral compositions were added to a laboratory size rotary mixer as a subcomponent and mixed with Portland cement, water, aggregates, and various chemical admixtures (i.e., air entrainer, water reducers, etc.) to obtain freshly mixed ready mix concrete compositions. The freshly mixed ready mix concrete compositions of Examples 21-25 and 29 were placed into 4×8 inch test cylinders, which were capped, allowed to harden, and taken to CMT Technical Services (West Valley City, Utah) for storage in a curing chamber and testing at various time intervals. Examples 26-28 and 30 were mixed and tested by CMT Technical Services.

Tables 5 and 6 shows complete mix designs (based on 1 cubic yard, exclusive of admixtures) used to prepare low carbon ready mix concrete compositions using the non-hydraulically reactive particulate mineral composition as a subcomponent.

TABLE 5

| Components (lb/yd³) | Example # (Mix ID) | | | | |
|---|---|---|---|---|---|
| Compressive Strength | 21 (RAE1) | 22 (RAE2) | 23 (RAE3) | 24 (RLF1) | 25 (RLF2) |
| ASTM C595 IL cement | 371.2 | 371.2 | 380 | 394.8 | 338.4 |
| Fly Ash | 104.4 | 104.4 | 110 | 112.8 | 141 |
| Limestone Powder | 145 | 145 | 150 | 124.08 | 172.02 |
| Type S Lime | 0 | 0 | 0 | 0 | 0 |
| Plaster of Paris | 0 | 0 | 0 | 0 | 2.82 |
| Coarse Aggregate (¾") | 1539 | 1539 | 1639 | 1825 | 1825 |
| Pea Gravel | 330 | 330 | 150 | 0 | 0 |
| Fine Aggregate (sand) | 1144 | 1144 | 1218 | 1340 | 1169 |
| Water | 250 | 250 | 252 | 265 | 245 |
| 3-day (psi/MPa) | 3980/27.4 | 3335/23.0 | 3975/27.4 | 2565/17.7 | 3040/21.0 |
| 7-day (psi/MPa) | 4910/33.9 | 4340/29.9 | 4660/32.1 | 3650/25.2 | 3325/22.9 |
| 28-day (psi/MPa) | 6485/44.7 | 5710/39.4 | 5670/39.1 | 5550/38.3 | 5310/36.6 |
| 56-day (psi/MPa) | 7325/50.5 | 6645/45.8 | 6650/45.9 | 6020/41.5 | 6395/44.1 |

TABLE 6

| Components (lb/yd³) | Example # (Mix ID) | | | | |
|---|---|---|---|---|---|
| Compressive Strength | 26 (3-5000) | 27 (4-5000) | 28 (5-5000) | 29 (1-4500) | 30 (6-4000) |
| ASTM C595 IL cement | 481.5 | 481.5 | 481.5 | 425 | 391 |
| Fly Ash | 127.5 | 127.5 | 127.5 | 80 | 104 |
| Limestone Powder | 182 | 182 | 182 | 165 | 150 |
| Type S Lime | 0 | 0 | 0 | 0 | 0 |
| Plaster of Paris | 0 | 0 | 0 | 0 | 0 |
| Coarse Aggregate (¾") | 1628 | 1633 | 1623 | 1760 | 1761 |
| Pea Gravel | 0 | 0 | 0 | 0 | 0 |
| Fine Aggregate (sand) | 1041 | 1057 | 1024 | 1150 | 1137 |
| Water | 267 | 258 | 278 | 245.7 | 250.7 |
| 3-day (psi/MPa) | 4155/28.6 | 4905/33.8 | 4290/29.6 | 2805/19.3 | 3375/23.3 |
| 7-day (psi/MPa) | 5435/37.5 | | 5540/38.2 | 4030/27.8 | 4240/29.2 |
| 28-day (psi/MPa) | 6940/47.8 | 8225/56.7 | 7283/50.2 | 5370/37.0 | 5270/36.3 |
| 56-day (psi/MPa) | 7840/54.1 | 9340/64.4 | 8300/57.2 | 6790/46.8 | 6190/42.7 |

Example 31

Any of the foregoing examples is modified by including silica fume in addition to or instead at least part of the natural pozzolan or fly ash.

Example 32

Any of the foregoing examples is modified by including calcined clay in addition to or instead at least part of the natural pozzolan, fly ash, or silica fume.

Example 33

Any of the foregoing examples is modified by including ground glass in addition to or instead at least part of the natural pozzolan, fly ash, silica fume, or calcined clay.

Example 34

Any of the foregoing examples is modified by including ground granulated blast furnace slag (GGBFS) in addition to or instead at least part of the natural pozzolan, fly ash, silica fume, calcined clay, or ground glass.

Example 35

Any of the foregoing examples is modified by including mine tailings in addition to or instead at least part of the limestone powder.

Example 36

Any of the foregoing examples is modified by including ground recycled concrete in addition to or instead at least part of the limestone powder or mine tailings.

Example 37

Any of the foregoing examples is modified by including ground siliceous aggregate fines in addition to or instead at least part of the limestone powder, mine tailings, or ground recycled concrete.

Example 38

Any of the foregoing examples is modified by including supplemental lime or supplemental sulfate in the blended particulate composition.

Example 39

Any of the foregoing examples is modified by including at least one admixture in the blended particulate composition selected form water reducers, accelerators, hydration stabilizers, and air entraining agents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A non-hydraulically reactive blended particulate composition for use in making low carbon blended cement or low carbon concrete, comprising:
   a pozzolanic component having a first D90; and
   a mineral filler component dry blended with the pozzolanic component without intergrinding, the mineral filler component having a second D90 greater than the first D90,
   wherein the composition is free of hydraulic cement,
   wherein the ratio of the D50 of the mineral filler component to the D50 of the pozzolanic component is in a range of about 1.1:1 to about 10:1.

2. The non-hydraulically reactive blended particulate composition of claim 1, wherein the pozzolanic component comprises at least one pozzolan selected from the group consisting of fly ash, finely ground bottom ash, finely ground steel slag, silica fume, metakaolin, volcanic ash, natural pozzolan, trass, calcined shale, calcined clay, ground glass, and combinations thereof.

3. The non-hydraulically reactive blended particulate composition of claim 1, wherein the pozzolanic component comprises at least two pozzolans blended without intergrinding selected from the group consisting of fly ash, finely ground bottom ash, finely ground steel slag, silica fume, metakaolin, volcanic ash, natural pozzolan, trass, calcined shale, calcined clay, ground glass, and combinations thereof.

4. The non-hydraulically reactive blended particulate composition of claim 1, wherein the pozzolanic component comprises at least two pozzolans interground together selected from the group consisting of fly ash, finely ground bottom ash, finely ground steel slag, silica fume, metakaolin, volcanic ash, natural pozzolan, trass, calcined shale, calcined clay, ground glass, and combinations thereof.

5. The non-hydraulically reactive blended particulate composition of claim 1, wherein the pozzolanic component comprises at least one pozzolan interground with a mineral filler different than the mineral filler component.

6. The non-hydraulically reactive blended particulate composition of claim 1, wherein the mineral filler component is selected from the group consisting of waste aggregate particles or fines, waste or manufactured limestone fines, quarry fines, limestone powder, granite fines, waste minerals from crushed rock, waste minerals from sand, stone dust, rock dust, marble dust, mine tailings, pulverized bottom ash, pulverized non-cementitious metallurgical slag, ground recycled concrete, waste or pulverized shale from shale oil extraction, waste or pulverized sand from tar sand extraction, and combinations thereof.

7. The non-hydraulically reactive blended particulate composition of claim 1, wherein the D90 of the pozzolanic component is equal to or less than about 45 µm.

8. The non-hydraulically reactive blended particulate composition of claim 1, wherein the D90 of the mineral filler component is equal to or greater than about 45 µm.

9. The non-hydraulically reactive blended particulate composition of claim 1, wherein the ratio of the D90 of the mineral filler component to the D90 of the pozzolanic component is in a range of about 1.1:1 to about 10:1.

10. The non-hydraulically reactive blended particulate composition of claim 1, wherein the ratio of the D50 of the mineral filler component to the D50 of the pozzolanic component is in a range of about 1.25:1 to about 10:1.

11. The non-hydraulically reactive blended particulate composition of claim 1, wherein the ratio of the D10 of the mineral filler component to the D10 of the pozzolanic component is in a range of about 1.1:1 to about 10:1.

12. The non-hydraulically reactive blended particulate composition of claim 1, wherein a ratio of the mineral filler component to the pozzolanic component, by weight or by volume, is in a range of about to about 90:10, or a ratio within a range define by any two of the foregoing.

13. The non-hydraulically reactive blended particulate composition of claim 1, wherein the non-hydraulically reactive blended particulate composition remains stable in the presence of moisture and are not significantly hydraulically reactive, wherein the non-hydraulically reactive blended particulate composition has a total alkali and alkaline earth metal oxide and hydroxide content of less than 10%.

14. A method of manufacturing a non-hydraulically reactive dry blended particulate composition for use in making low carbon blended cement or low carbon concrete, comprising:
   dry blending a pozzolanic component having a first D90 and a mineral filler component without intergrinding to form the non-hydraulically reactive blended particulate composition, the mineral filler component having a second D90 greater than the first D90,
   wherein the composition consists essentially of the pozzolanic component and the mineral filler component and is free of hydraulic cement.

15. A method of manufacturing low carbon blended cement comprising dry blending the non-hydraulically reactive blended particulate composition of claim 1 with hydraulic cement without intergrinding.

16. The method of claim 15, wherein the hydraulic cement is selected from Portland cement and ground granulated blast furnace slag.

17. A method of manufacturing low carbon concrete, comprising
   combining the non-hydraulically reactive blended particulate composition of claim 1 with hydraulic cement, aggregate, and water to form a fresh concrete mix;
   positioning the fresh concrete mix in a desired shape; and
   allowing the fresh concrete mix to harden to form hardened concrete.

18. A dry blended particulate composition for use in making low carbon blended cement or low carbon concrete, consisting of:
   ground granulated blast furnace slag having a first D90;
   optionally at least one pozzolan selected from the group consisting of fly ash, finely ground bottom ash, finely ground steel slag, silica fume, metakaolin, volcanic ash, natural pozzolan, trass, calcined shale, calcined clay, ground glass, and combinations thereof; and
   a mineral filler component dry blended with the ground granulated blast furnace slag without intergrinding, the mineral filler component having a second D90 greater than the first D90,
   wherein the composition is free of Portland cement.

19. The blended particulate composition of claim 18, further comprising the at least one pozzolan.

20. A method of manufacturing low carbon blended cement comprising dry blending the blended particulate composition of claim 18 with Portland cement without intergrinding.

21. A non-hydraulically reactive blended particulate composition for use in making low carbon blended cement or low carbon concrete, comprising:
   a pozzolanic component having a first D90; and
   a mineral filler component dry blended with the pozzolanic component without intergrinding, the mineral filler component having a second D90 greater than the first D90,
   wherein the composition is free of hydraulic cement,
   wherein the pozzolanic component comprises at least two pozzolans interground together selected from the group consisting of fly ash, finely ground bottom ash, finely ground steel slag, silica fume, metakaolin, volcanic ash, natural pozzolan, trass, calcined shale, calcined clay, ground glass, and combinations thereof.

* * * * *